US007646331B2

(12) United States Patent
Ruby et al.

(10) Patent No.: US 7,646,331 B2
(45) Date of Patent: Jan. 12, 2010

(54) RADAR DETECTOR AND COLLISION AVOIDANCE SYSTEM INTERFACE

(75) Inventors: Daniel Ruby, Palos Park, IL (US); Robert Kevin Lazzara, Chicago, IL (US)

(73) Assignee: Midcity Engineering, Chicago, IL (US)

( * ) Notice: Subject to any disclaimer, the term of this patent is extended or adjusted under 35 U.S.C. 154(b) by 0 days.

(21) Appl. No.: 12/243,810

(22) Filed: Oct. 1, 2008

(65) Prior Publication Data

US 2009/0085791 A1 Apr. 2, 2009

Related U.S. Application Data

(60) Provisional application No. 60/995,931, filed on Oct. 1, 2007.

(51) Int. Cl.
*G01S 13/93* (2006.01)

(52) U.S. Cl. ............................. 342/70; 342/71; 342/91; 342/101; 340/435; 340/436; 340/903

(58) Field of Classification Search ............. 342/70–72, 342/91, 101, 176, 179; 340/435, 436, 903; 701/301
See application file for complete search history.

(56) References Cited

U.S. PATENT DOCUMENTS

| | | | | |
|---|---|---|---|---|
| 6,223,125 | B1 * | 4/2001 | Hall | 701/301 |
| 6,232,910 | B1 * | 5/2001 | Bell et al. | 342/70 |
| RE38,870 | E * | 11/2005 | Hall | 701/301 |
| 7,375,620 | B2 * | 5/2008 | Balbale et al. | 340/435 |
| 2004/0155811 | A1 * | 8/2004 | Albero et al. | 342/70 |
| 2007/0276600 | A1 * | 11/2007 | King et al. | 701/301 |
| 2009/0085791 | A1 * | 4/2009 | Ruby et al. | 342/20 |

* cited by examiner

*Primary Examiner*—John B Sotomayor
(74) *Attorney, Agent, or Firm*—Adam K. Sacharoff; Much Shelist

(57) ABSTRACT

An interface system of the present invention interconnects with a collision avoidance system and a radar detector. The interface system monitors and determines when sensors, from the collision avoidance system, are not required and selectively turns them off, thereby eliminating interference from the sensor and allowing the radar detector to work properly. The interface system also acts as a filter which enables and disables the audible and visual alerts of the radar detector and selects when to turn these filters on and off.

28 Claims, 6 Drawing Sheets

RADAR DETECTOR AND COLLISION AVOIDANCE SYSTEM INTERFACE

CROSS REFERENCE TO RELATED APPLICATIONS

The present application claims priority to U.S. Provisional Application 60/995,931 filed Oct. 1, 2007.

FIELD OF THE INVENTION

The present invention relates to radar detectors and collision avoidance systems and how the two systems interact, and more particularly to an interface system that monitors and controls the collision avoidance system and radar detector to help reduce problems that arise when both are operating.

BACKGROUND OF THE INVENTION

One or more of the embodiments of the present invention are directed to solve problems with collision avoidance systems and radar detectors. Collision avoidance systems automatically monitor the proximity, dynamic motion, and/or RFID/identity characteristics of objects within a vehicle's path and periphery. These systems employ a series of radar transmitters and receivers in the front and/or rear of the vehicle. The system bounces radar waves off of any obstacles around the vehicle and determines if the vehicle is in close proximity to other vehicles. While mostly used at low speeds, for example when parking, more dynamic uses of collision avoidance systems are currently used when the vehicle is moving at higher speeds and when in cruise control. The collision avoidance system when used at higher speeds may alert the driver to the distance between vehicles and whether the other vehicles or objects are moving to within a certain proximity. The problem with collision avoidance systems is that it confuses and interferes with a radar detector also installed on the vehicle.

The front and rear sensors of the collision avoidance system transmit signals on the same radar frequency band as police radar which when read by the radar detector creates false alerts, which interfere with the radar detector such that the radar detector will constantly alert even when there is no police radar being transmitted. In addition, even when the collision avoidance system is not in use by the driver the sensors from the collision avoidance system are constantly transmitting and thus would constantly interfere with the radar detector.

A solution is needed to solve the problem such that both systems, the collision avoidance systems and the radar detector system, can be used without interference or confusion.

SUMMARY OF THE INVENTION

The embodiments of the invention solve the aforementioned problems by employing a collision and radar interface system which monitors internal information provided by the radar detector system and combines the internal information with vehicle information and information from the collision avoidance system to determine whether the interface system can selectively turn aspect of the collision avoidance system or the radar detector off and on.

The collision avoidance system is typically used by drivers when parking and also when the selectively turned on by the driver, such as when driving in cruise control. The interface system monitors and determines when the sensors, from the collision avoidance, are not required and selectively turns them off, thereby eliminating the interference and allowing the radar detector to work properly. The interface system also acts as a filter when the collision avoidance is active. The filter determines whether source signals received from the radar detector are probably from the collision avoidance system or when they are more likely received from an outside source, such as a police radar. The interface system acting as the filter further enables and disables the audible and visual alerts of the radar detector and the sensors of the collision avoidance system.

In one embodiment of the present invention there is an interface system for collision avoidance and radar detector systems in a moving vehicle. The interface system includes a first relay for controlling at least one sensor defined by the collision avoidance system; a second relay for controlling an emitting of audible alerts from the radar detector system; and a third relay for controlling a display of radar information from the radar detector system. The interface system further determines a status of the collision avoidance system and the speed of the moving vehicle. The interface system is sent such that when the status of the collision avoidance system is OFF and the speed of the moving vehicle is above a first speed limit and above a second speed limit, setting the first, second, and third relays such that the at least one sensor defined by the collision avoidance system is not transmitting signals, the audible alerts from the radar detector system is emitting sounds, and radar information is being displayed.

In another embodiment, when the status of the collision avoidance system is ON, the interface system processes information obtained from the radar detector system through a threshold filtering process. The threshold filtering process may determine whether a signal strength is above a threshold limit such and if it is the driver can be alerted to the radar information or any portion thereof. If the signal strength is not above the threshold limit the filtering process determines if the incoming signal is on the same frequency band and the transmission from the sensors defined by the collision avoidance system. If the frequency bands are different the driver is alerted. If the frequency bands are the same then the filtering process does not alert the driver.

Other aspect of the invention can be directed to the various predetermined speeds used to check the vehicle speed.

Numerous advantages and features of the invention will become readily apparent from the following detailed description of the invention and the embodiments thereof, and from the accompanying drawings.

BRIEF DESCRIPTION OF THE DRAWINGS

A fuller understanding of the foregoing may be had by reference to the accompanying drawings, wherein.

DETAILED DESCRIPTION OF THE EMBODIMENTS

Figure 1:
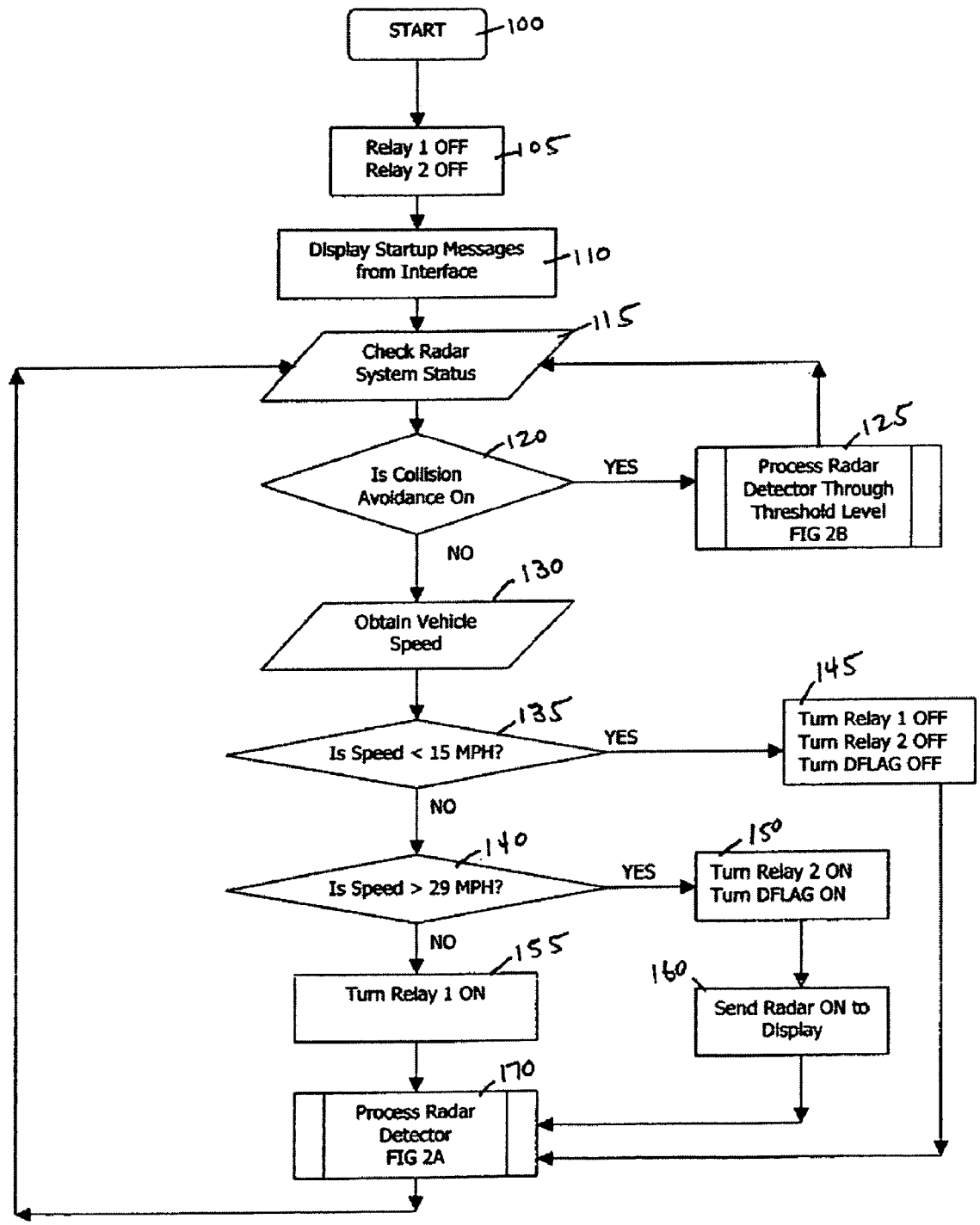
FIG. 1 is a block diagram illustrating functional aspects of an interface system in accordance to one embodiment of the present invention.

While the invention is susceptible to embodiments in many different forms, there are shown in the drawings and will described herein, in detail, the preferred embodiments of the present invention. It should be understood, however, that the present disclosure is to be considered an exemplification of the principles of the invention and is not intended to limit the spirit or scope of the claims by the embodiments illustrated.

Referring now to FIG. 1, there is illustrated an interface system for a radar detector system and a collision avoidance system. The interface system which can be shown in the electrical schematic of FIG. 4, can also be shown by the flow charts presented in FIGS. 1 to 2B. It is further understood that the present invention can be accomplished by either hardware interface microcontroller or by software. Software may be easily created and installed into pre-existing radar detectors firmware. One or more of the present embodiments are embodied in a hardware interface microcontroller that can be is installed in a vehicle. The interface receives and/or sends data or information from the radar detector and/or the collision avoidance systems and is capable of sending information for display to a monitor in the vehicle. The monitor is typically placed on the front dash of the vehicle easily readable and accessible by the driver. For purposes of the present invention, the collision avoidance system and the radar detector systems would be provided by their respective manufacturers and include their respective components and software.

The interface system, in accordance with an embodiment of the present invention, once initiated, box 100, sets two relays. Relay 1 controls the collision avoidance sensor array and Relay 2 controls the audible output from the radar detector. When Relay 1 is turned ON the collision avoidance sensor array is disabled and when turned OFF the sensor array is enabled. When Relay 2 is turned ON audible sounds from the radar detector may be heard by the driver and when Relay 2 is OFF the sound output is disabled. Once the interface system initializes, box 100, the interface systems sets both Relay 1 and Relay 2 to OFF, box 105. The vehicle display may then begin displaying startup messages from the interface system, box 110, such as "INTERFACE INITIATED." Upon display of the startup messages, box 110, the interface system will begin interfacing and monitoring the radar detector, collision avoidance system, and/or vehicle information by entering into various subroutines, box 115.

The interface system will first determine if the collision avoidance system is ON, box 120. This occurs when the vehicle is operating at a predetermined set low speed, that is set by the manufacturer of the vehicle or the collision avoidance system. In one embodiment it was determined that the predetermined set low speed was about 9 MPH. The collision avoidance system is also turned ON if the driver uses the cruise control. It is also important to note that even if the collision avoidance system is turned OFF the collision avoidance sensor array is usually always ON, which is what causes the interference with the radar detector as mentioned above. It is also conceivable that the driver could actively turn the collision avoidance system ON during normal non-cruise control situations.

Figure 2A:
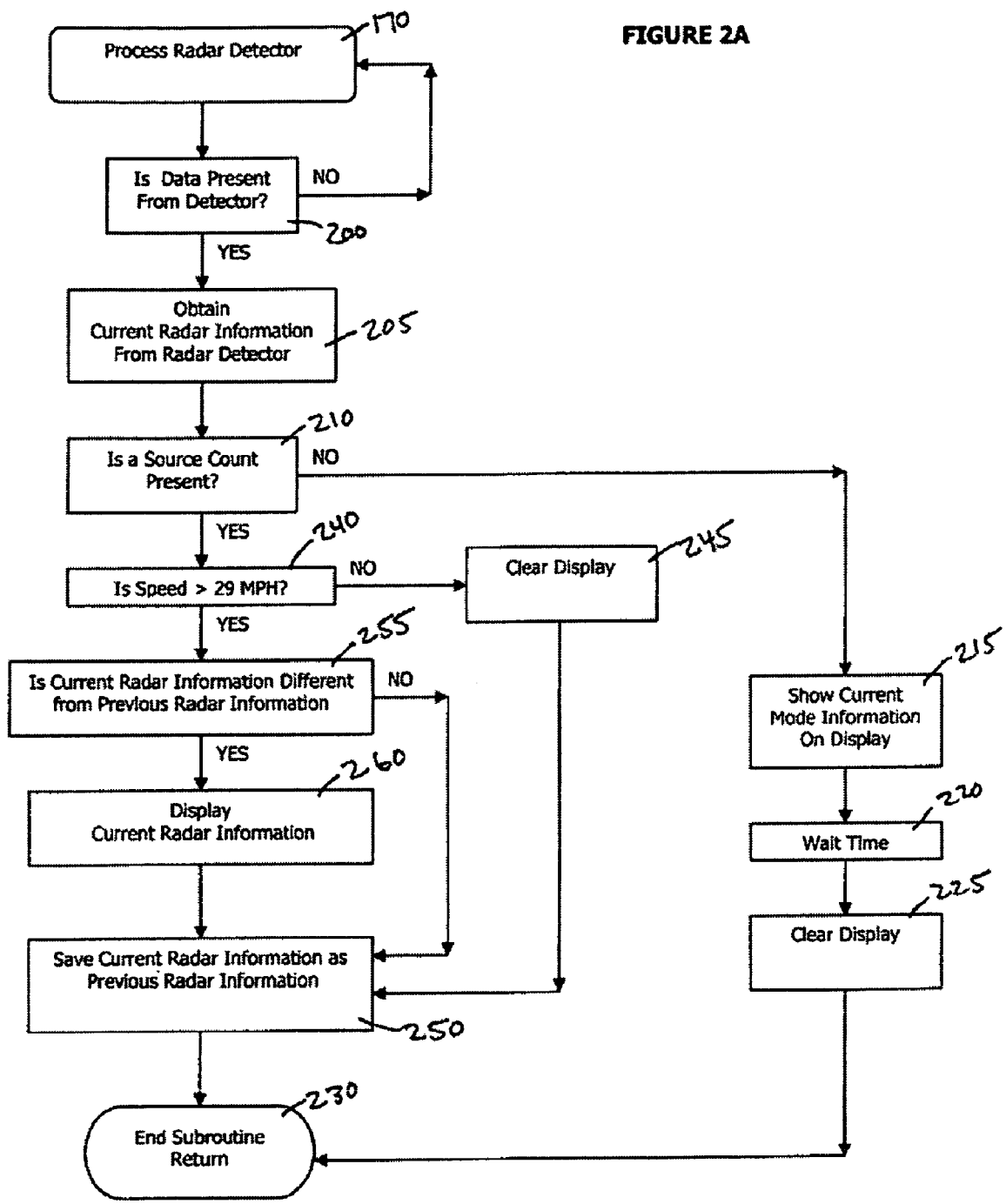
FIG. 2A is a block diagram of a subroutine used in FIG. 1.
Figure 2B:
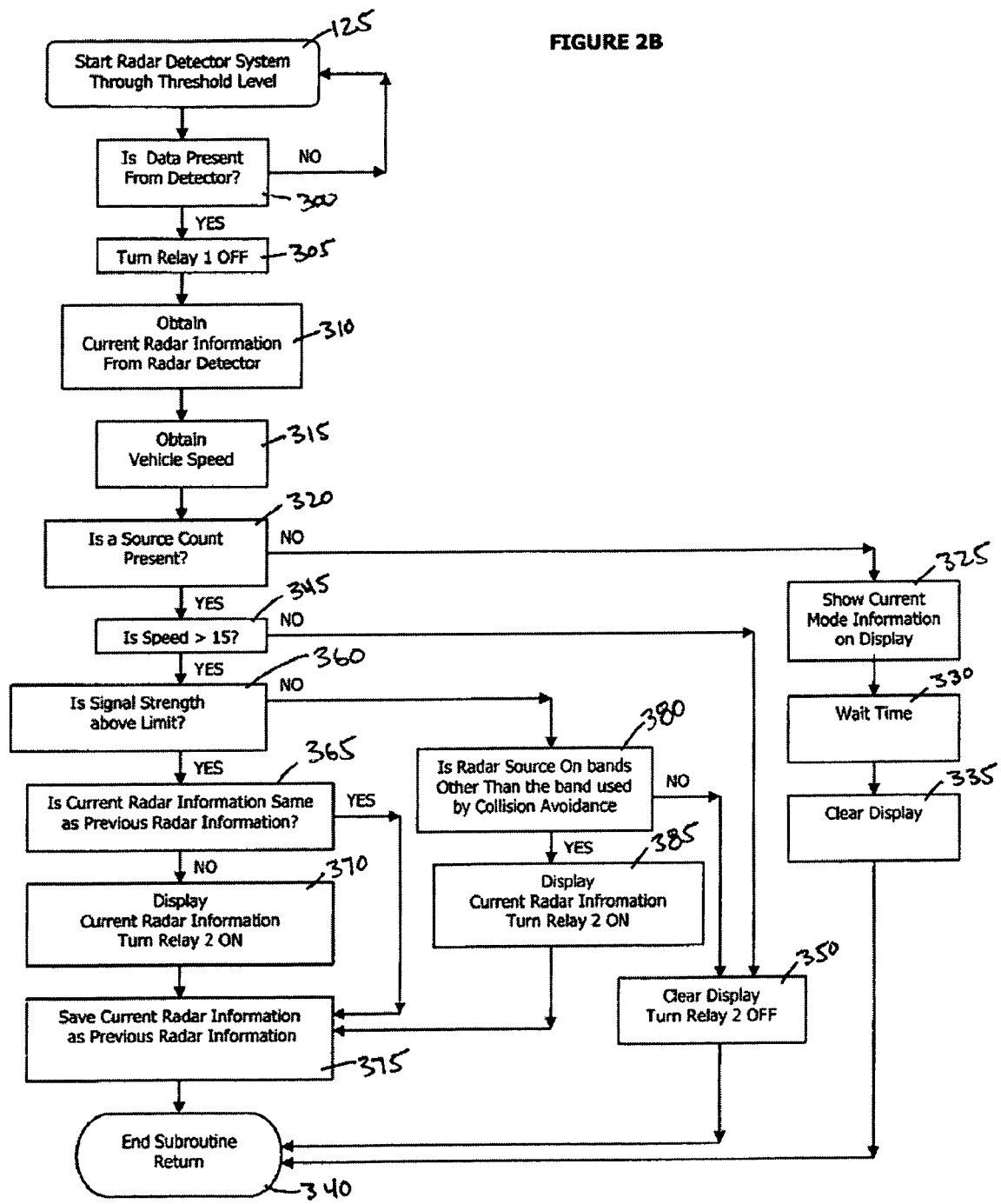
FIG. 2B is a block diagram of a subroutine used in FIG. 1.

If the collision avoidance system is ON then the interface system will process the radar detector through a threshold level, box 125, discussed in greater detail in reference to FIG. 2B. If the collision avoidance system is OFF, the interface system will obtain the speed of the vehicle, box 130. The speed of the vehicle can be determined by either accessing and obtaining the speed through the vehicle bus. Although the speed of the vehicle can also be obtained using GPS or by obtaining information from the vehicles speed sensor. The vehicle bus is an electronic communications network that interconnects components inside a vehicle and is widely used by vehicles manufactured.

The speed of the vehicle is then checked against various levels, boxes 135 and 140. If the speed is less than a first speed limit, box 135, for example 15 MP, then the interface system turns Relay 1 and Relay 2 OFF and turns DLFAG OFF, box 145. DFLAG is a flag used by the interface system when turning the display ON and OFF (or at least the access to the display is turned ON and OFF). The interface system then begins to process the Radar Detector, box 170, discussed in greater detail in reference to FIG. 2A. The first speed limit may be appropriately set or programmed to a level that is slightly higher than the predetermined set low speed of the collision avoidance system, or may be set or programmed to equal the predetermined set low speed. By setting it slightly higher than the predetermined set low speed, the interface system does not interfere with the collision avoidance system when automatically needed by the driver during slower speeds. Therefore, by setting Relay 1 OFF, the collision avoidance sensor array is enabled when the vehicle is traveling less than the first speed limit, which is defined as being slightly higher than the predetermined set low speed required by the collision avoidance system itself.

If the speed of the vehicle is more than the first speed limit, box 135, the interface system will check the speed against a second speed limit, box 140. The second speed limit may be appropriately set or programmed to a level that activates the radar audible sounds. In one embodiment this upper speed limit was set for 29 MPH.

As soon as the vehicle reaches a speed above the first speed limit [15 MPH, i.e. 16 MPH] the interface system will turn Relay 1 ON which disables the collision avoidance sensors, box 155. The interface system will then begins to process the radar detector, box 170.

Once the speed of the vehicle exceeds the second speed limit, i.e. 29 MPH, box 140, the interface will Turn Relay 2 ON and turn DFLAG ON, box 150, enabling both the sound of the radar detector and monitor in the vehicle. Alternatively, the sound alert from the radar detector may be relayed through A short message may be sent to the display, such as RADAR ON, to inform the driver that the sound for the radar detector has been activated, box 160. The interface system will then begins to process the radar detector, box 170.

Figure 3:
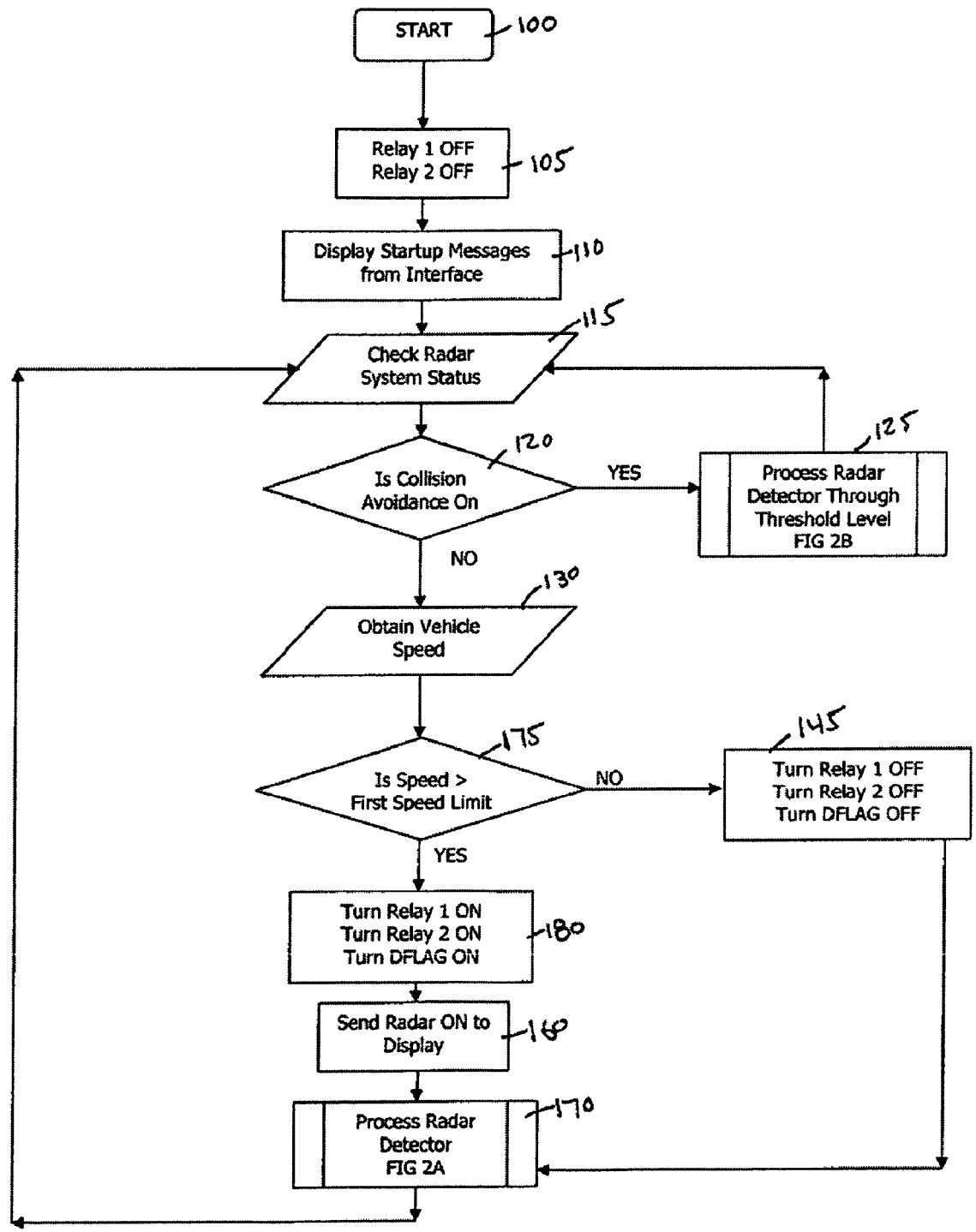
FIG. 3 is a block diagram illustrating functional aspects of an interface system in accordance to another embodiment of the present invention.

In other embodiments the second speed limit may be set or programmed to be equal to the first speed limit, such that as soon as the speed of the vehicle exceeds the first speed limit the interface system turns RELAY 1 ON, RELAY 2 ON, and DFLAG ON with a message RADAR ON sent to the display. This embodiment is shown in FIG. 3, with reference made to box 175 in setting the second speed limit equal to the first speed limit and box 180 where the interface system sets the RELAYs and DFLAG ON.

Turning now to FIG. 2A, the subroutine of box 170 processing of the radar detector will be discussed. Subroutine of box 170 is accessed when the collision avoidance system is OFF, such as when traveling at speeds above the first speed limit. The interface system will check for any data or information coming from the radar detector, box 200. The interface system will then obtain the current radar information from the radar detector, box 205. The current radar information obtained from the radar detector may include any one or more of the following: (i) a signal strength that the interface system may convert into a percentage for threshold purposes, discussed in greater detail below; (ii) an individual radar frequency band used by the radar detector or possibly the band used by the outside source and identified by the radar detector; (iii) the direction of the signal source coming at the vehicle, such as front, rear, side; (iv) the "source count", or the number of signal sources coming at the vehicle; (v) the monitoring mode of the radar detector, i.e. city, highway, reduced x band coverage. Some of these are set by the driver, such as the monitoring mode, which may be changed by the driver at any time.

Once the current radar information is obtained, box 205, the interface system will determine if a source count is present, box 210. If a source count is present, the radar detector has detected an incoming radar source. If there is no source count, the interface system will show the current mode information on the display, box 215, and then it may enter a delay, box 220, and then clear the display, box 225. The interface system will then return, box 230, back to the main routine at which point the interface system will continue interfacing and monitoring the radar detector, collision avoidance system, and/or vehicle information by entering into various subroutines, box 115.

If there is a source count the interface system will check the speed of the vehicle, box 240 to determine if the speed of the vehicle is above a third speed limit. The third speed limit, in the present embodiment, is set or programmed to be equal to the second speed limit. However, the third speed limit may be set or programmed to be higher then the second speed limit. If the vehicle is not moving above the third speed limit the interface system can simply clear the display, box 245, and then save the current radar information as previous radar information, box 250. The interface system will then return, box 230, back to the main routine at which point the interface system will continue interfacing and monitoring the radar detector, collision avoidance system, and/or vehicle information by entering into various subroutines, box 115.

If the vehicle is traveling above the third speed limit, box 240, the interface system will determine if the current radar information is different than the previous radar information, box 255. It being noted that if the current and previous radar information is the same no further display is needed and the interface system may simply proceed to box 250. However, if the current radar information is different, the interface system will display on the vehicle monitor the current radar information or any portion thereof, box 260. The interface system will then proceed to box 250. It is noted that during the processing of the radar detector the interface system had turned on the audible portion of the radar detector by turning Relay 2 ON, box 150, as soon as the vehicle was traveling above the second speed limit, box 140. Therefore not only will the radar detector send the current radar information or any portion thereof to the display, but it is also allowing the radar detector to either emit its audible sounds or the interface system is sending the sounds to the speakers to inform the driver of a source when the collision avoidance system is not on, box 120.

Turning now to FIG. 2b the subroutine of box 125 is discussed, mainly the interface system is processing the radar detector through a threshold level when the collision avoidance system is turned on, box 120, such as if the driver is in cruise control, driving at slow speeds, or the driver has elected to turn on the cruise control.

The interface system will check for any data or information coming from the radar detector, box 300. The interface system will then make sure the collision avoidance sensors are enabled but turning RELAY 1 OFF, box 305.

The interface system then obtains the current radar information from the radar detector, box 310. As mentioned above, the current radar information obtained from the radar detector may include any one or more of the following: (i) a signal strength that the interface system may convert into a percentage for threshold purposes; (ii) an individual radar band used by the radar detector or possibly the band used by the outside source and identified by the radar detector; (iii) the direction of the signal source coming at the vehicle, such as front, rear, side; (iv) the source count, or the number of signal sources coming at the vehicle; (v) the monitoring mode of the radar detector, i.e. city, highway, reduced x band coverage. Some of these are set by the driver, such as the monitoring mode, which may be changed by the driver at any time. The interface system also obtains the speed of the vehicle, box 315.

Once the current radar information and the vehicle speed is obtained, the interface system will determine if a source count is present, box 320. If a source count is present, the radar detector has detected an incoming radar source. If there is no source count, the interface system will show the current mode information on the display, box 325, and then it may enter a delay, box 330, and then clear the display, box 335. The interface system will then return, box 340, back to the main routine at which point the interface system will continue interfacing and monitoring the radar detector, collision avoidance system, and/or vehicle information by entering into various subroutines, box 115.

As mentioned above, if a source count is present, box 320, the interface system will first determine if the speed of the vehicle is greater then the first speed limit, box 345. If the vehicle is traveling slower then the first speed limit, the interface may simply clear the display and make sure the Relay 2 is OFF, box 350, so the driver is not alerted to any audible sounds from the radar detector. The interface system will then return, box 340, back to the main routine at which point the interface system will continue interfacing and monitoring the radar detector, collision avoidance system, and/or vehicle information by entering into various subroutines, box 115.

If the speed of the vehicle is greater then the first speed limit, box 345, the interface system will determine if the signal strength is above a predetermined threshold limit, box 360. The predetermined threshold limit is a set or preprogrammed limit in the interface system. The limit may be a percentage of a maximum 100% signal strength and represents a threshold for which any signal strengths above this limit should automatically pass to alert the driver. For this embodiment the signal strength percentage could be set at 60%, meaning any and all signal strengths above 60% will automatically pass to the driver as further described below. As mentioned herein when the collision avoidance system is turned ON the collision avoidance sensor array may interfere with the radar detector, such that the radar detector will pick up and falsely alert the driver that a source has been detected when in fact the only source are one or more signals from the collision avoidance sensor array. The threshold limit determination, box 360, is one manner in which the interface system correctly identifies a source to the driver. Since signals from the collision avoidance sensor array tend to be weak signals, if detected by the radar detector these signals would almost never reach above the threshold limit. Therefore, if a signal has been detected by the radar detector and its signal is above the threshold limit, the interface system moves to the next step.

Once the interface system determines the signal strength is above the threshold limit, the interface system may determine if the current radar information is the same as the previous radar information, box 365. If the information is different, the current radar information or any portion thereof can be displayed on the monitor, box 370, and the interface system will turn Relay 2 ON so audible alerts can be heard by the driver.

The current radar information is saved as the previous radar information, box 375, and then the interface system will then return, box 340, back to the main routine at which point the interface system will continue interfacing and monitoring the radar detector, collision avoidance system, and/or vehicle information by entering into various subroutines, box 115.

If the current radar information is the same as the previous radar information, box 365, the interface does not have to replay the radar information on the screen or reset the Relay, the interface system can simply reset the previous radar information, box 375, and then return, box 340.

As mentioned above, the threshold limit determination, box 360, is one manner in which the interface system correctly identifies a source to the driver, however, if the signal source is not above the threshold limit, it does not necessarily mean the source signal is coming from the collision avoidance system and for which point the driver should still be alerted. If the interface system determines that the signal strength is not above the threshold limit, the interface system will then determine if the source signal is on a radar band that is different than the band used by the collision avoidance system, box 380. Radar frequency bands can include X, K, Ka, and Laser. By setting or preprogramming the interface system with the known band used by the collision avoidance system, the interface system can identify if the source signal is on a band different than the collision avoidance system. If the bands are different, then the driver should be alerted regardless of the signal strength. The interface system will then display the current radar information and turn Relay 2 ON for audible alerts, box 385. The interface system may then set the current radar information to the previous radar information, box 375, and then return, box 340.

If, however, the source signal is on the radar band also used by the collision avoidance system and the signal strength was not above the threshold limit, the interface system would not falsely alert the driver of the possible source signal emanating from the collision avoidance system and the interface system may simply proceed to clear the display and Turn Relay 2 OFF, box 350, and then return, box 340.

This filtering of the source signal against a threshold limit and against the band used by the collision avoidance system is one aspect of the present invention that solves a well-known problem and issue in the industry.

Figure 4:
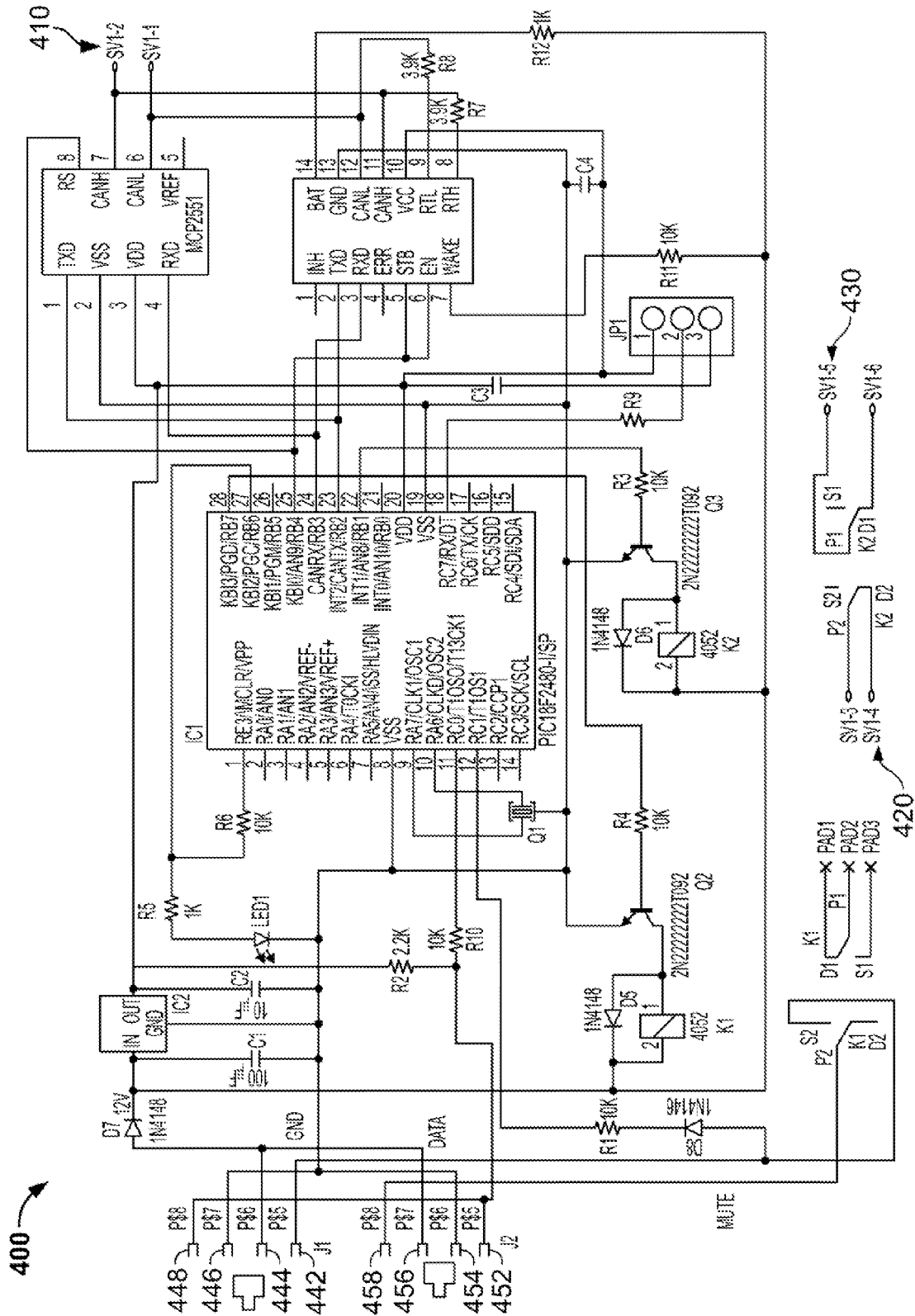
FIG. 4 is an electric schematic of a processor used by an interface system in accordance to an embodiment of the present invention.

Referring now to FIG. 4, there is shown one embodiment of the present invention in the form of an electrical schematic of a processor layout 400 for an interface system in accordance with one or more of the present embodiments. The connections in the layout 400 are as described below;

SV1-1 and SV1-2 represent connections to the vehicle network+ and vehicle network-, respectively, referenced as numeral 410. SV1-3 and SV1-4 represent connections to the rear sensor array power source and power feed, respectively, referenced as numeral 420. SV1-5 and SV1-6 represent connections to the front sensor array power source and power feed, respectively, referenced as numeral 430.

J1.5 represents a sound feed out to external speaker, numeral 442; J1.6 represent a 12 volt power connection, numeral 444; J1.7 represents a ground connection, numeral 446; and J1.8 represents a data feed out to the external display connection, numeral 448.

J2.5 represents a data feed connection from the radar detector, numeral 452; J2.6 represents a ground feed connection to the radar detector, numeral 454; J2.7 represents a power connection to the radar detector, numeral 456; and J2.8 represents a connection for receiving sound from the radar detector, numeral 458.

Figure 5:
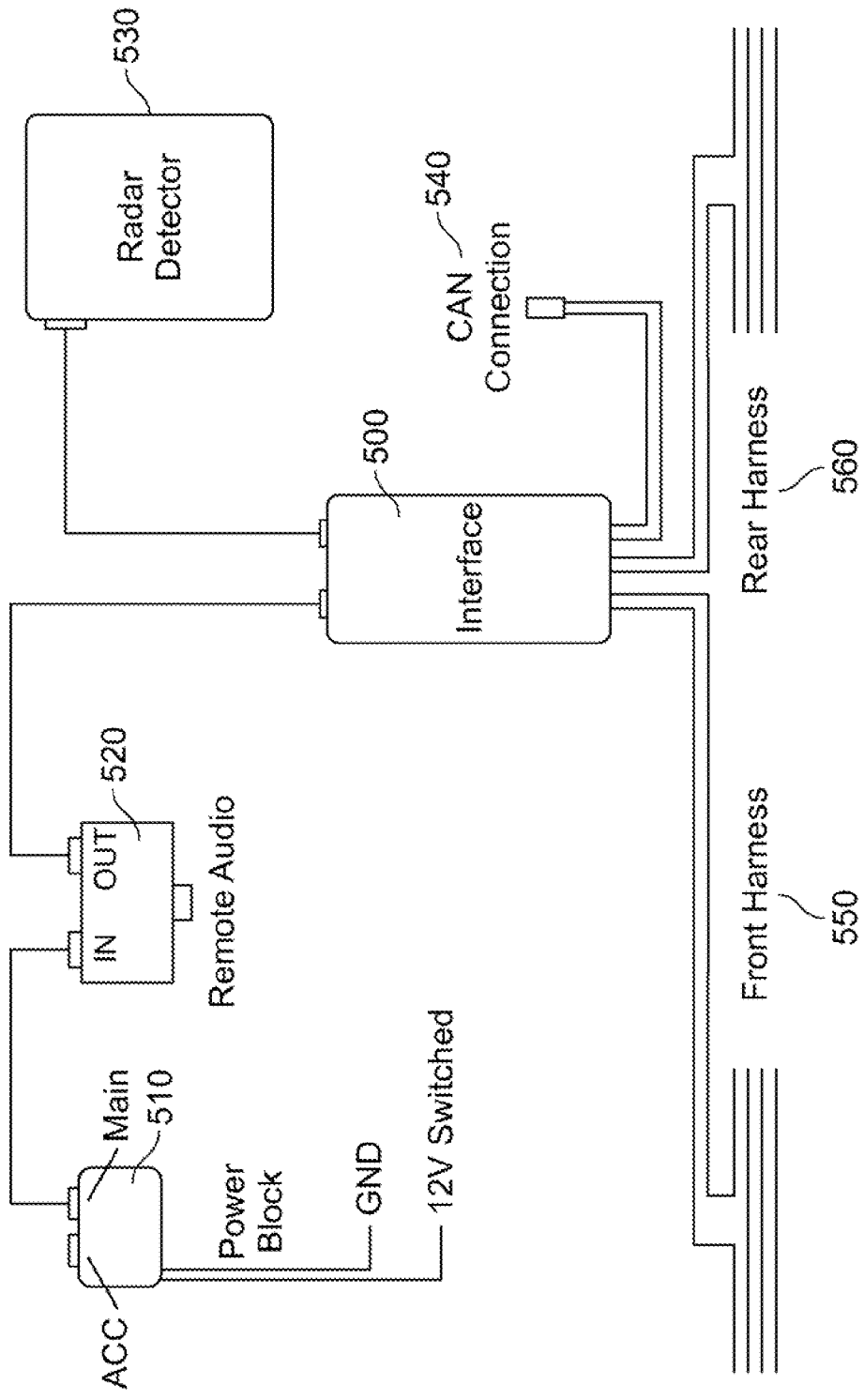
FIG. 5 is a block diagram illustrating an interface system connected in a vehicle.

Referring now to FIG. 5, there is shown one embodiment of the present invention of an interface system 500 shown connected in a vehicle by the block diagram. The interface system 500 is connected to a power block 510 through a remote audio device 520 and then the power passes through the interface system 500 to the radar detector 530. The interface system 500 is then connected to the vehicle bus or network through the CAN connection 540. Front and rear harness connections, 550 and 560 respectively, attached the interface system to the front and rear sensor arrays in the collision avoidance system. Connection to the CAN connection allows the interface system to both send and receive data from one or more of the following: the radar detector, speedometer, collision control system, etc., which allow the radar detector to function while still maintaining usage of the collision avoidance system and its cruise control features.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred by the embodiment or by the claims presented herein.

We claim:

1. An interface system for collision avoidance and radar detector systems in a moving vehicle, the interface system comprising:
    a first relay for controlling at least one sensor defined by the collision avoidance system;
    a second relay for controlling an emitting of audible alerts from the radar detector system;
    a third relay for controlling a display of radar information from the radar detector system;
    determining a status of the collision avoidance system;
    determining a speed of the moving vehicle;
    wherein when the status of the collision avoidance system is OFF and the speed of the moving vehicle is above a first speed limit and above a second speed limit, setting the first, second, and third relays such that the at least one sensor defined by the collision avoidance system is not transmitting signals, the audible alerts from the radar detector system is emitting sounds, and radar information is being displayed.

2. The interface system of claim 1, wherein the first speed limit is equal to the second speed limit.

3. The interface system of claim 1, wherein the second speed limit is greater than the first speed limit.

4. The interface system of claim 1, wherein when the collision avoidance system is OFF and the speed of the moving vehicle is below the first speed limit, controlling the first, second, and third relays such that the at least one sensor defined by the collision avoidance system is transmitting signals, the audible alerts from the radar detector system is not emitting sounds, and radar information is not being displayed.

5. The interface system of claim 1, wherein the first speed limit is equal to a predetermined set low speed defined by the collision avoidance system as a speed in which the collision avoidance system is ON.

6. The interface system of claim 1, wherein the first speed limit is greater than a predetermined set low speed defined by the collision avoidance system as a speed in which the collision avoidance system is ON and is less than the second speed limit.

7. The interface system of claim 1 further comprising:
obtaining radar information from the radar detector, including a source count and a radar mode; and
wherein when the status of the collision avoidance system is OFF, determining if a source count is present, wherein when a source count is not present, controlling the display to show the radar mode.

8. The interface system of claim 7, wherein when the status of the collision avoidance system is OFF, a source count is present, and the speed of the vehicle is above the second speed limit controlling the display to show the radar information or a portion of the radar information.

9. The interface system of claim 1, wherein when the collision avoidance system is ON, processing information obtained from the radar detector system through a threshold filtering process.

10. The interface system of claim 9, wherein the threshold filtering process includes:
controlling the at least one sensor defined by the collision avoidance system such that the at least one sensor is transmitting signals;
obtaining radar information from the radar detector, including a source count, a radar mode, a frequency band of an incoming radar signal, and determining a signal strength of the incoming radar signal; and
obtaining a speed of the moving vehicle,
wherein when a source count is not present, controlling the display to show the radar mode.

11. The interface system of claim 9, wherein the threshold filtering process further includes:
determining whether the speed of the vehicle is above a third speed limit, when a source count is present, wherein when the speed of the vehicle is above the third speed limit, determining whether the signal strength is above a threshold limit, such that the display is controlled to show the radar information or a portion of the radar information, when the signal strength is above the threshold limit.

12. The interface system of claim 11, wherein the third speed limit is equal to the first speed limit.

13. The interface system of claim 11, wherein the threshold limit is 60% of a maximum possible signal strength.

14. The interface system of claim 11, wherein when the signal strength is below a threshold limit, determining whether the frequency band of the incoming radar signal is on a frequency band used by the sensor of the collision avoidance system.

15. The interface system of claim 14, wherein when the frequency band of the incoming radar signal is the same frequency band used by the sensor of the collision avoidance system, setting the second and third relays such that the audible alerts from the radar detector system is not emitting sounds, and radar information is not being displayed.

16. The interface system of claim 14, wherein when the frequency band of the incoming radar signal is not the same frequency band used by the sensor of the collision avoidance system, setting the second and third relays such that the audible alerts from the radar detector system is emitting sounds, and radar information or a portion thereof is being displayed.

17. An interface system for collision avoidance and radar detector systems in a moving vehicle, the interface system comprising:
a first relay for controlling at least one sensor defined by the collision avoidance system;
a second relay for controlling an emitting of audible alerts from the radar detector system;
a third relay for controlling a display of radar information from the radar detector system;
determining a status of the collision avoidance system;
determining a speed of the moving vehicle;
wherein when the status of the collision avoidance system is ON, processing information obtained from the radar detector system through a threshold filtering process.

18. The interface system of claim 17, wherein the threshold filtering process includes:
controlling the at least one sensor defined by the collision avoidance system such that the at least one sensor is transmitting signals;
obtaining radar information from the radar detector, including a source count, a radar mode, a frequency band of an incoming radar signal, and determining a signal strength of the incoming radar signal; and
obtaining a speed of the moving vehicle,
wherein when a source count is not present, controlling the display to show the radar mode.

19. The interface system of claim 17, wherein the threshold filtering process further includes:
determining whether the speed of the vehicle is above a third speed limit, when a source count is present, wherein when the speed of the vehicle is above the third speed limit, determining whether the signal strength is above a threshold limit, such that the display is controlled to show the radar information or a portion of the radar information, when the signal strength is above the threshold limit.

20. The interface system of claim 19, wherein the third speed limit is equal to the first speed limit.

21. The interface system of claim 19, wherein the threshold limit is 60% of a maximum possible signal strength.

22. The interface system of claim 19, wherein when the signal strength is below a threshold limit, determining whether the frequency band of the incoming radar signal is on a frequency band used by the sensor of the collision avoidance system.

23. The interface system of claim 22, wherein when the frequency band of the incoming radar signal is the same frequency band used by the sensor of the collision avoidance system, setting the second and third relays such that the audible alerts from the radar detector system is not emitting sounds, and radar information is not being displayed.

24. The interface system of claim 22, wherein when the frequency band of the incoming radar signal is not the same frequency band used by the sensor of the collision avoidance system, setting the second and third relays such that the audible alerts from the radar detector system is emitting sounds, and radar information or a portion thereof is being displayed.

25. The interface system of claim 17, wherein when the status of the collision avoidance system is OFF and the speed of the moving vehicle is above a first speed limit and above a second speed limit, setting the first, second, and third relays such that the at least one sensor defined by the collision avoidance system is not transmitting signals, the audible alerts from the radar detector system is emitting sounds, and radar information is being displayed.

26. The interface system of claim 24 further comprising:
obtaining radar information from the radar detector, including a source count and a radar mode; and wherein when the status of the collision avoidance system is OFF, determining if a source count is present, wherein when a source count is not present, controlling the display to show the radar mode.

27. The interface system of claim 25, wherein when the status of the collision avoidance system is OFF, a source count is present, and the speed of the vehicle is above the second speed limit controlling the display to show the radar information or a portion of the radar information.

28. The interface system of claim 24, wherein when the collision avoidance system is ON, processing information obtained from the radar detector system through a threshold filtering process.

* * * * *